US009703316B2

(12) United States Patent
Kimura

(10) Patent No.: US 9,703,316 B2
(45) Date of Patent: Jul. 11, 2017

(54) INFORMATION PROCESSING APPARATUS CAPABLE OF CORRECTING TIME-OF-DAY MANAGEMENT FUNCTION, CONTROL METHOD THEREFOR, AND STORAGE MEDIUM

(71) Applicant: CANON KABUSHIKI KAISHA, Tokyo (JP)

(72) Inventor: Tomohiro Kimura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 128 days.

(21) Appl. No.: 14/539,047

(22) Filed: Nov. 12, 2014

(65) Prior Publication Data

US 2015/0135000 A1    May 14, 2015

(30) Foreign Application Priority Data

Nov. 14, 2013 (JP) ................... 2013-235843

(51) Int. Cl.
*G06F 1/14* (2006.01)
*H04J 3/06* (2006.01)

(52) U.S. Cl.
CPC .............. *G06F 1/14* (2013.01); *H04J 3/0638* (2013.01)

(58) Field of Classification Search
CPC .................. G06F 1/14; H04J 3/0638
See application file for complete search history.

(56) References Cited

U.S. PATENT DOCUMENTS

| 6,449,291 B1* | 9/2002 | Burns .................. H04J 3/0655 370/516 |
| 8,819,161 B1* | 8/2014 | Pannell ................ H04J 3/0697 709/208 |
| 2007/0240004 A1 | 10/2007 | Maeda | |
| 2010/0177763 A1* | 7/2010 | Van Der Stok ....... H04J 3/0638 370/350 |
| 2012/0254418 A1* | 10/2012 | Callaghan .......... H04L 41/0686 709/224 |

FOREIGN PATENT DOCUMENTS

| JP | 2003156579 A | 5/2003 |
| JP | 2007276341 A | 10/2007 |

* cited by examiner

*Primary Examiner* — Albert Wang
(74) *Attorney, Agent, or Firm* — Rossi, Kimms & McDowell LLP

(57) ABSTRACT

An information processing apparatus that is capable of correcting a time-of-day management function in the information processing apparatus even in an environment where the time of day cannot be properly measured in the information processing apparatus in a power-saving mode. A first time of day is obtained from an external apparatus on a network. A second time of day is identified based on the number of input CPU clocks per prescribed time period. The number of input CPU clocks per prescribed time period is corrected based on the first time of day and the second time of day.

5 Claims, 6 Drawing Sheets

INFORMATION PROCESSING APPARATUS CAPABLE OF CORRECTING TIME-OF-DAY MANAGEMENT FUNCTION, CONTROL METHOD THEREFOR, AND STORAGE MEDIUM

BACKGROUND OF THE INVENTION

Field of the Invention

The present invention relates to an information processing apparatus, a control method therefor, and a storage medium, and in particular to an information processing apparatus and a control method therefor that are capable of correcting a time-of-day management function in an environment where the time of day cannot be properly measured in the information processing apparatus in a power-saving mode, as well as a storage medium.

Description of the Related Art

For information processing apparatuses (including image forming apparatuses) having a communication function, there is known a technique that, in order to save power, shuts off the power to a network interface card (NIC) and others in the information processing apparatuses in a power-saving mode (see, for example, Japanese Laid-Open Patent Publication (Kokai) No. 2007-276341). Also, it is known that as a way to save power, a clock gating technique such as reducing the number of clocks of a CPU (central processing unit) in a power-saving mode is used. Power can be saved to a greater extent by using a technique that clock-gates a CPU in a NIC in combination with the technique that shuts off the power to some components and operates an information processing apparatus with only the NIC.

Precisely measuring and managing time-of-day information on an information processing apparatus is a process indispensable for operating systems normally in an information processing apparatus. An information processing apparatus is able to accurately perform processes dependent on the time of day such as automatic execution of a job at a specified time of day and return from a power-saving mode by precisely managing time-of-day information as described above. A CPU and an RTC (real-time clock) are used as means for measuring the time of day in common information processing apparatuses. In general, an RTC works even in a situation where power supply to a system is limited, and is in charge of measuring the time of day in this situation. Accordingly, an RTC is configured to be equipped with a standby power source such as a primary battery. On the other hand, as a way to manage the time of day without using a CPU or an RTC, there is, for example, a technique that obtains time-of-day information from another server on a network by connecting an information processing apparatus to the network (see, for example, Japanese Laid-Open Patent Publication (Kokai) No. 2003-156579).

However, clock gating of a CPU presents a problem that clock intervals of the CPU become unstable, and a timer of the CPU fluctuates (the timer does not count time with accuracy at regular intervals). In general, an LSI (large-scale integration) comprised of small-scaled circuits such as a NIC has no RTC in many cases, and the time of day cannot be properly measured with an RTC. Namely, in an information processing apparatus that operates with only a NIC in a power-saving mode, if clock gating of a CPU is applied to a small-scale circuit such as a NIC having no RTC, there will arise a problem that the time of day cannot be properly measured. Moreover, even if a NIC has an RTC, the same problem will arise upon battery exhaustion because power is supplied from a primary battery.

Further, in the situation described above, the time of day cannot be properly managed in a power-saving mode, and this presents a problem that processes dependent on the time of day such as automatic execution of a job at a specified time of day and return from the power-saving mode cannot be properly performed.

SUMMARY OF THE INVENTION

The present invention provides an information processing apparatus and a control method therefor that are capable of correcting a time-of-day management function in the information processing apparatus even in an environment where the time of day cannot be properly measured in the information processing apparatus in a power-saving mode, as well as a storage medium.

Accordingly, a first aspect of the present invention provides an information processing apparatus comprising an obtaining unit configured to obtain a first time of day from an external apparatus on a network, an identifying unit configured to identify a second time of day based on the number of input CPU clocks per prescribed time period, and a correction unit configured to correct the number of input CPU clocks per prescribed time period based on the first time of day and the second time of day.

Accordingly, a second aspect of the present invention provides a control method for an information processing apparatus comprising an obtaining step of obtaining a first time of day from an external apparatus on a network, an identifying step of identifying a second time of day based on the number of input CPU clocks per prescribed time period, and a correction step of correcting the number of input CPU clocks per prescribed time period based on the first time of day and the second time of day.

Accordingly, a third aspect of the present invention provides a non-transitory computer-readable storage medium storing a program for causing a computer of an information processing apparatus to execute a control method for the information processing apparatus, the control method comprising an obtaining step of obtaining a first time of day from an external apparatus on a network, an identifying step of identifying a second time of day based on the number of input CPU clocks per prescribed time period, and a correction step of correcting the number of input CPU clocks per prescribed time period based on the first time of day and the second time of day.

According to the present invention, the number of input CPU clocks per prescribed time period is corrected based on the first time of day obtained from the external network on the network and the second time of day identified based on the number of input CPU clocks per prescribed time period. This allows the time-of-day management function in the power-saving mode to be corrected using the server function on the network even in an environment where the time of day cannot be properly measured in the information processing apparatus in the power-saving mode.

Further features of the present invention will become apparent from the following description of exemplary embodiments (with reference to the attached drawings).

DESCRIPTION OF THE EMBODIMENTS

The present invention will now be described in detail with reference to the drawings showing an embodiment thereof.

In the embodiment described hereafter, SNTP (simple network time protocol) is used as a function of obtaining the present time of day. It should be noted that although in the following description, SNTP is used as the function of obtaining the present time of day, the function of obtaining the present time of day is not limited to this, but may be other methods and functions.

Figure 1:
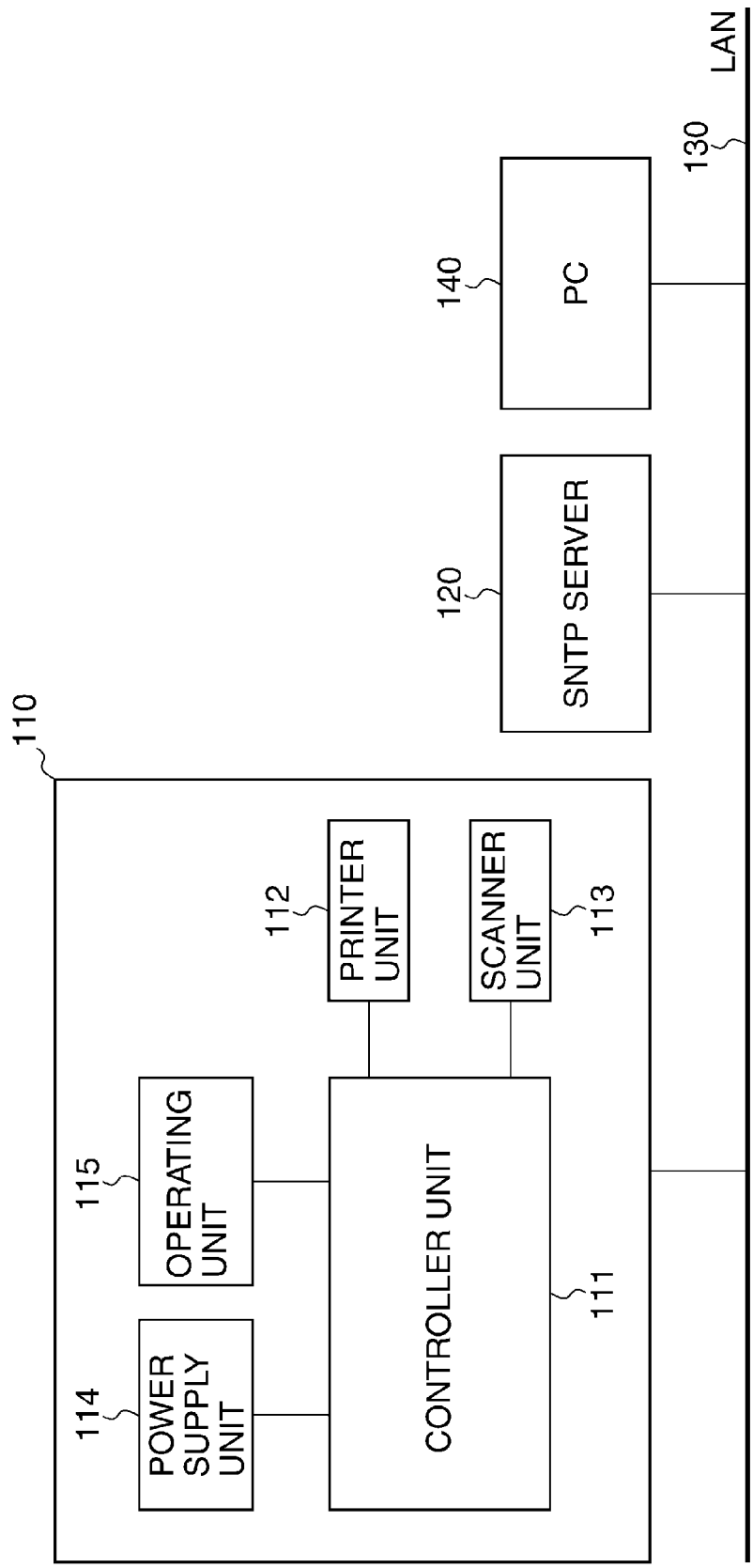
FIG. 1 is a diagram showing an exemplary network environment to which an image forming apparatus, which is an information processing apparatus according to an embodiment of the present invention, is connected.

FIG. 1 is a diagram showing an exemplary network environment to which an image forming apparatus, which is an information processing apparatus according to the embodiment of the present invention, is connected.

Referring to FIG. 1, the image forming apparatus 110 having an image output function, an SNTP server 120 (external apparatus), from which the present time of day is obtained, and a PC 140 operating with AutoIP are connected to a LAN (local-area network) 130.

The image forming apparatus 110 has an operating unit 115 for a user of the image forming apparatus 110 to perform various types of operations, a scanner unit 113 that reads image information in accordance with instructions from the operating unit 115, and a printer unit 112 that prints image data on sheets. The image forming apparatus 110 also has a controller unit 111 that controls the scanner unit 113 and the printer unit 112 based on instructions received via the operating unit 115 and the LAN 130, and a power supply unit 114 that supplies power to each part of the image forming apparatus 110.

Figure 2:
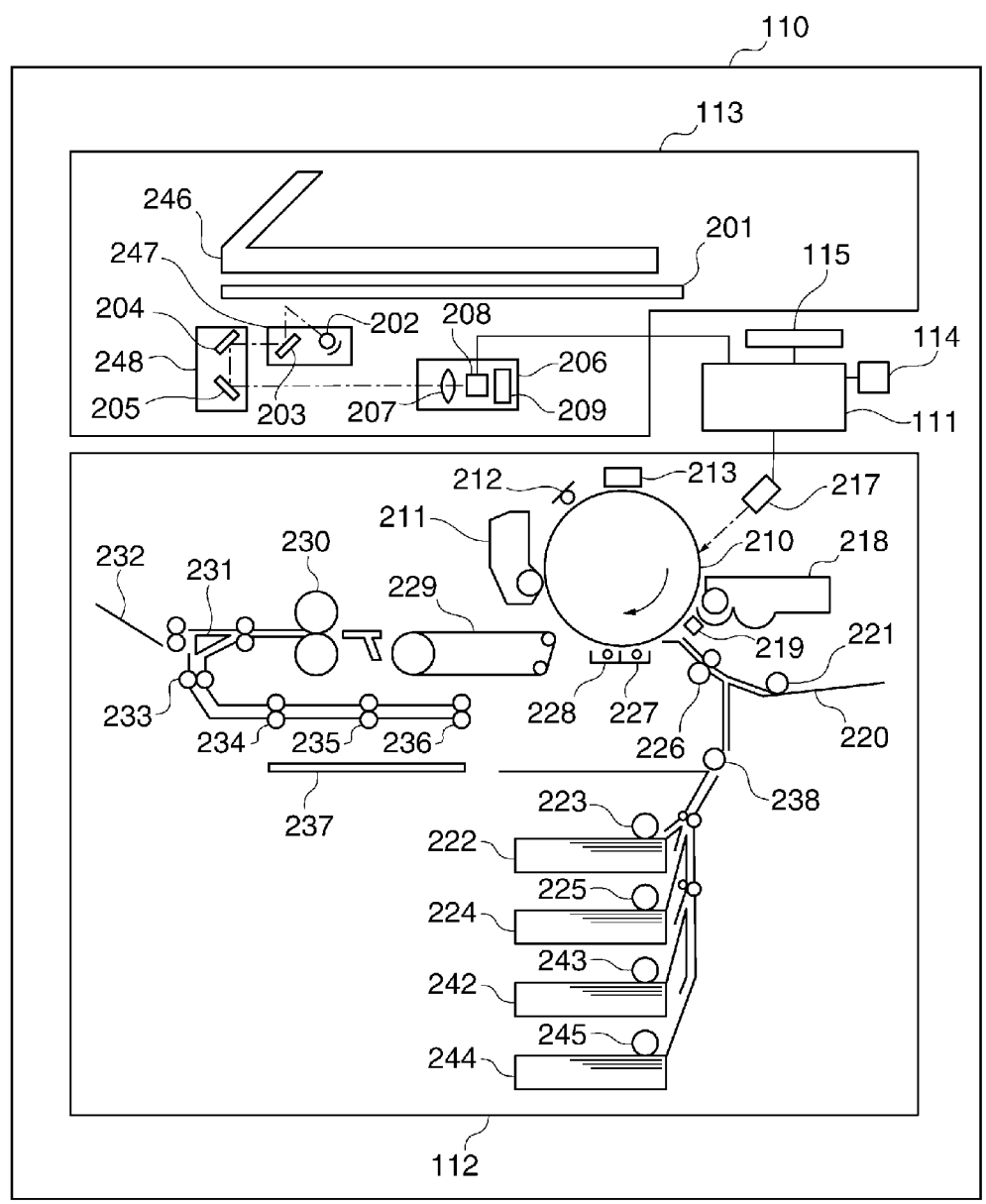
FIG. 2 is a diagram schematically showing an internal construction of the image forming apparatus in FIG. 1.

FIG. 2 is a diagram schematically showing an internal construction of the image forming apparatus 110 in FIG. 1.

Referring to FIG. 2, the scanner unit 113 has an original platen glass 210, an original automatic feeder 246, scanning units 247 and 248, and a CCD unit 206. The original automatic feeder 246 successively feeds originals to a predetermined position on the original platen glass 201 on which an original is mounted. The scanning unit 247 disposed under the original platen glass 201 has an original illumination lamp 202 and a scanning mirror 203 and scans an original, which is mounted on the original platen glass 201, in a main scanning direction by exposing it to light. The scanning unit 248 has scanning mirrors 204 and 205 that reflect light reflected from the scanning unit 203 toward the CCD unit 206, and scans an original in a sub scanning direction at one half the scanning speed of the scanning unit 247. The CCD unit 206 has an image-forming lens 207 that receives light reflected from the scanning mirror 205 to form an image, an image pickup device 208 comprised of a CCD that converts an image formed on the image-forming lens 207 into a digital image signal of, for example, 8 bits, and a CCD driver 209 that drives the image pickup device 208.

In response to an instruction input from the operating unit 115, the controller unit 111 generates image data based on an image signal output from the image pickup device 208. The controller unit 111 also controls the overall operation of the image forming apparatus 110.

The printer unit 112 has a photosensitive drum 210, an exposure unit 217, a developing device 118, and a pre-transfer charger 219, and forms an electrostatic latent image by exposing the photosensitive drum 210 to light based on image data generated by the controller unit 111. The exposure unit 217 is comprised of, for example, a semiconductor laser, and the developing device 118 holds toner which is a black developer, and develops an electrostatic latent image on the photosensitive drum 210 using toner. The pre-transfer charger 219 applies high voltage to a toner image developed on the photosensitive drum 210 before transfer.

The printer unit 112 also has a manual feed tray 220 and sheet-feeding units 222, 224, 242, and 244 in which sheets are stored. The printer unit 112 also has feeding rollers 221, 223, 225, 243, and 245 that feed sheets on the manual feed tray 220 and sheets housed in the sheet-feeding units 222, 224, 242, and 244, respectively. Further, the printer unit 112 has registration rollers 226 that feed sheets fed from the feeding rollers 221, 223, 225, 243, and 245 to the photosensitive drum 210. The feeding rollers 221, 223, 225, 243, and 245 temporarily stop sheets on the manual feed tray 220 or sheets stored in the sheet-feeding units 222, 224, 242, and 244 at the registration rollers 226, and feed them in accordance with the write timing of a toner image developed on the photosensitive drum 210.

In the printer unit 112, a transfer charger 227 transfers a toner image developed on the photosensitive drum 210 to a sheet being fed. A separation charger 228 separates the sheet, to which the toner image has been transferred, from the photosensitive drum 210. A conveying belt 229 conveys the sheet separated from the photosensitive drum 210 to a fixing device 230, to be described later. A cleaner 211 collects toner that remains on the photosensitive drum 210 without being transferred onto the sheet. A pre-exposure lamp 212 removes electricity from the photosensitive drum 210, and a primary charger 213 uniformly charges the photosensitive drum 210 with electricity.

The fixing device 230 fixes the toner image onto the sheet to which the toner image has been transferred. A sorter 232 receives the sheet, onto which the toner image has been fixed, via a flapper 231. An intermediate tray 237 receives the sheet, onto which the toner image has been fixed, via the flapper 231 and feeding rollers 233 to 236. A sheet re-feeding roller 238 feeds the sheet in the intermediate tray 237 to the photosensitive drum 210 again. It should be noted that the flapper 231 is configured to switch destinations of a sheet with a toner image fixed thereon between the sorter 232 and the intermediate tray 237, and the feeding rollers 233 to 236 are configured not to invert (multiplexed) or to invert (double-sided) a sheet with a toner image fixed thereon.

Figure 3:
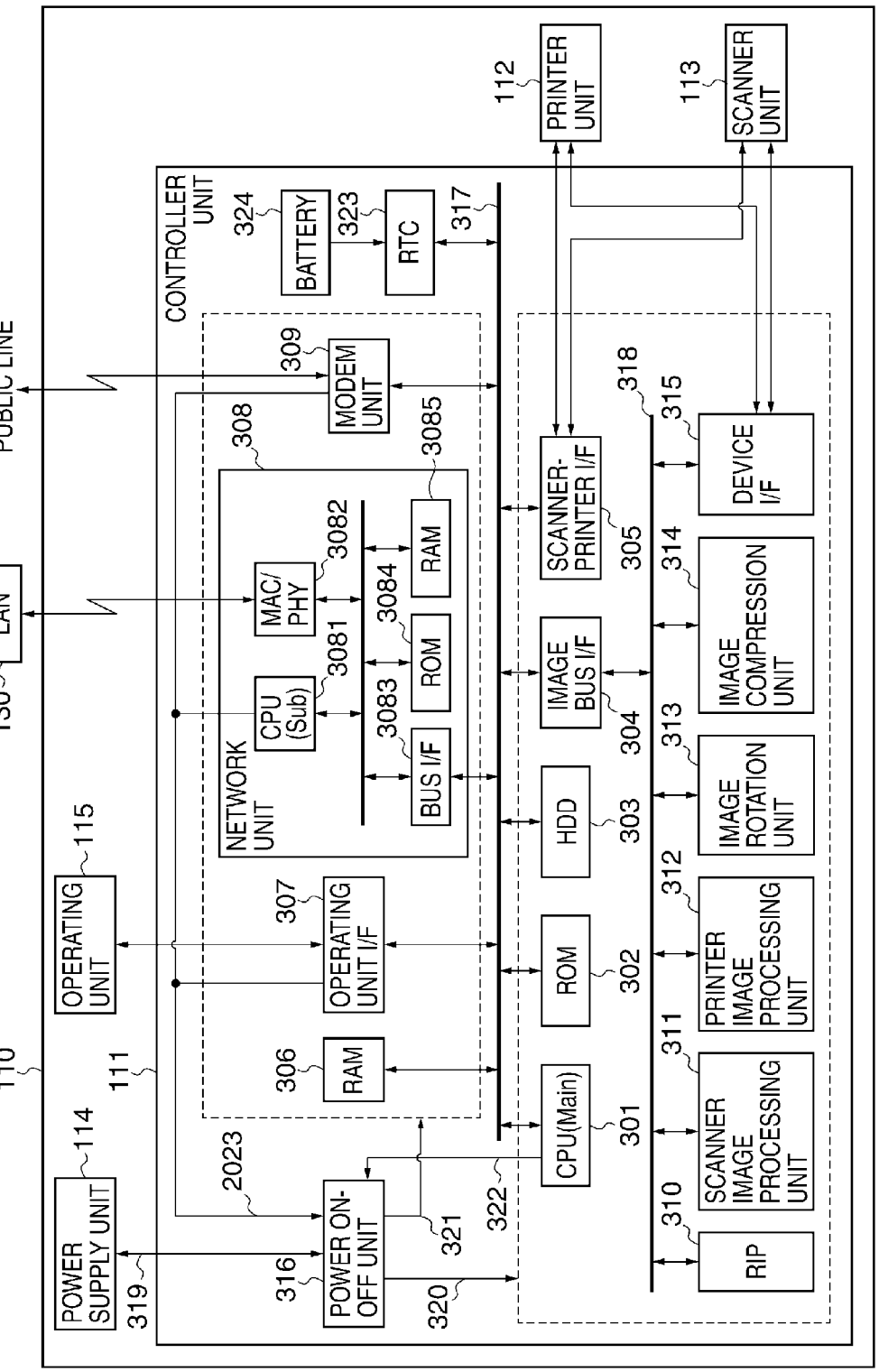
FIG. 3 is a block diagram schematically showing an arrangement of a controller unit in FIG. 2.

FIG. 3 is a block diagram schematically showing an arrangement of the controller unit 111 in FIG. 2.

Referring to FIG. 3, the controller unit 111 is connected to the scanner unit 113, the printer unit 12, the LAN 130, and a public line, and inputs and outputs image data and device information.

In the controller unit 111, a raster image processor (RIP) 310 decompress a PDL code, which is included in a print job received from a computer terminal on the LAN 130 via the LAN 130, into a bitmap image. A scanner image processing unit 311 corrects, processes, and edits image data input from the scanner unit 113. A printer image processing unit 312 carries out correction, resolution conversion, and so forth on image data output (printed) by the printer unit 112. An image rotation unit 313 rotates image data.

An image compression unit 314 carries out a compression-decompression process such as JPEG on multilevel-coded image data and JBIG, MMR, or MH on binary-coded image data. A device I/F 315 connects the scanner unit 113 and the printer unit 112 to the controller unit 111 and carries out synchronous-to-asynchronous conversion of image data. An image bus 318 connects them to one another and transfers image data at high speed.

The CPU 310 acts as a controller that controls the image forming apparatus 110 and controls a network unit 308, to be described later. A RAM 306 is a system work memory for the CPU 301 to work and also serves as an image memory for temporarily storing image data.

An operating unit I/F 307, which is an interface with the operating unit 115, plays a role in transmitting information input by a user of this system via the operating unit 115 to the CPU 301 and outputting image data, which is to be displayed on the operating unit 115, to the operating unit 115. The network unit 308 is connected to the LAN 130 and carries out communications with the SNTP server 120 and other communication terminals (for example, the PC 140) on the LAN 130 to receive data from computer terminals on the LAN 130 and process the received data. A modem unit 309 is connected to the public line and carries out data communications with (sends and receives data to and from) an external facsimile apparatus. A ROM 302 stores a boot program that is executed by the CPU 301. A hard disk drive (HDD) 303 stores system software, image data, software counter values, and so on. A scanner-printer communication I/F 305 carries out communications with respective CPUs of the scanner unit 113 and the printer unit 112. A system bus 317 connects them to one another.

An image bus I/F 304 is a bus bridge that connects the system bus 317 and the image bus 318 to each other and converts data structures. A power on-off unit 316 supplies DC power received from the power supply unit 114 via a power supply line 319 to predetermined circuit elements of the controller unit 111 via power supply lines 320 and 321. The power on-off unit 316 is controlled based on control signals received from the network unit 308 via a control signal line 2023 and control signals received from the CPU 301 via a control signal line 322. The power on-off unit 316 also selectively turns on and off the power supply lines 320 and 321. The power supply line 320 is connected to the CPU 301, the ROM 302, the HDD 303, the image bus I/F 304, and the scanner-printer communication I/F 305. The power supply line 320 is also connected to the device I/F 315, the image rotation unit 313, the image compression unit 314, the RIP 310, the scanner image processing unit 311, and the printer image processing unit 312. The power supply line 321 is also connected to the RAM 306, the operating unit I/F 307, the network unit 308, and the modem unit 309.

The image forming apparatus 110 in FIG. 1 carries out a printing process as described hereafter based on a print job transmitted from a communication terminal (for example, the PC 140) connected to the LAN 130. First, the CPU 301 stores, in the RAM 306, print data that is image data received from the communication terminal connected to the LAN 130 via the network unit 308. Next, the CPU 301 supplies the image data to the RIP 310 via the image bus I/F 304. The RIP 310 decompresses the image data (PDL code) into bitmap data. The image compression unit 314 compresses the bitmap data and stores the compressed bitmap data in the HDD 303.

The image data (the compressed image data) stored in the HDD 303 is supplied to the image compression unit 314 via the image bus I/F 304. The image compression unit 314 decompresses the supplied image data (the compressed image data). The printer image processing unit 312 carries out printer stabilization, resolution conversion, and so on. The image rotation unit 313 subjects image data to a rotation process as the need arises. Then, the image data that has been subjected to various processes is transmitted as print data to the printer unit 112 via the device I/F 315 and printed on a sheet by the printer unit 112.

The image forming apparatus 110 is able to operate in a normal mode in which power is not limited during operation and a deep sleep mode that is a power-saving mode. In the normal mode, the power supply unit 114 supplies power to the power on-off unit 316 via the power supply line 319. The CPU 301 then controls the power on-off unit 316 so that each of the power supply line 320 and the power supply line 321 can be turned on. At this time, power is supplied to both the CPU 310 and the network unit 308.

In the deep sleep mode, the power supply unit 114 supplies power to the power on-off unit 316 via the power supply line 319. The CPU 301 controls the power on-off unit 316 so that the power supply line 320 can be turned off, and the power supply line 321 can be turned on. At this time, the power to main circuit elements of the controller unit 111 including the CPU 310 is shut off, and hence the amount of power consumed by the image forming apparatus 110 is significantly reduced.

Upon receiving data such as a print job from a computer terminal on the LAN 130, the network unit 308 controls the power on-off unit 316 so as to return to the normal mode.

It should be noted that although in the deep sleep mode, the power to the CPU 310 is shut off, the present invention may take other modes. For example, in the deep sleep mode, a smaller amount of power may be supplied to the CPU 310 than in the normal mode. In this case, in the deep sleep mode, processes that can be performed by the CPU 301 are limited to a greater extent than in the normal mode. The limited processes include at least processing on data received from a computer terminal on the LAN 130 by the network unit 308.

Moreover, in the deep sleep mode, power is supplied from the power supply unit 114 to the RAM 306, and hence the RAM 306 backs up a system program by self-refreshing.

Although the network unit 308 carries out a process to shift from the deep sleep mode, which is a power-saving mode, into the normal mode, the present invention may take other forms. Specifically, not only the network unit 308 but also the modem unit 309 or the operating unit I/F 307 may shift from the deep sleep mode into the normal mode. In the former, facsimile communication using a public line is possible, and in the latter, receipt of an instruction from a user of the operating unit 115 is possible.

The image forming apparatus 110 returns from the deep sleep mode to the normal mode in a manner described hereafter.

Upon receiving a print job from, for example, the PC 140, the network unit 308 analyzes a packet received as the print job to determine whether or not a data sequence corresponding to a physical address unique to the network unit 308 is included in the packet. Upon detecting the data sequence corresponding to the network unit 308, the network unit 308 controls the power on-off unit 316 via the control signal line 2023 to turn on the power supply line 321, and starts the CPU 301.

At this time, the CPU 301 determines whether or not a factor that has started the CPU 301 is return from the deep sleep mode to the normal mode. Upon determining that the factor that has started the CPU 301 is return from the deep sleep mode to the normal mode, the CPU 301 starts a startup sequence. Here, the CPU 301 dispenses with a sequence in which it downloads a system program from the HDD 303 into the RAM 306, and uses the system program backed up by the RAN 306 at the time of shifting into the deep sleep mode. As a result, the controller unit 111 that has shifted into the normal mode responds to the print job from the computer terminal on the LAN 130 and causes the printer unit 112 to start print output.

The network unit 308 has a CPU 3081, a MAC/PHY 3082, a bus I/F 3083, a ROM 3084, and a RAM 3085, and they are connected to one another via a bus. The network unit 308 is also connected to the system bus 317 via the bus I/F 3083. The CPU 3081 controls the MAC/PHY 3082.

WOL (Wake-on-LAN) patterns are stored in the ROM 3084. When the image forming apparatus 110 is operating in the deep sleep mode, the CPU 3081 determines whether or not a packet received by the MAC/PHY 3082 via the LAN 130 matches any WOL pattern stored in the ROM 3084. Upon determining that the packet received by the MAC/PHY 3082 matches any WOL pattern, the CPU 3081 issues an instruction to the power supply unit 114 so that the power on-off unit 316 can resume power supply to the CPU 301 and others via the power supply line 320. As a result, the image forming apparatus 110 shifts from the deep sleep mode into the normal mode.

Alternative response patterns as well are stored in the ROM 3084. Response data associated with the alternative response patterns is stored in the RAM 3085. This response data includes, for example, status information on the image forming apparatus 110 (for example, information indicating an operating mode of the image forming apparatus 110 and information indicating the number of remaining sheets).

When the image forming apparatus 110 is operating in the deep sleep mode, the CPU 3081 determines whether or not a packet received by the MAC/PHY 3082 via the LAN 130 matches any alternative response pattern stored in the ROM 3084. Upon determining that the packet received by the MAC/PHY 3082 matches any alternative response pattern, the CPU 3081 reads response data corresponding to the alternative response pattern, which has been determined to match the packet, from the RAM 3085. Then, the CPU 3081 sends the response data read from the RAM 3085 to the computer terminal on the LAN 130 which is a source of the alternative response pattern.

It should be noted that even when the CPU 3081 detects an alternative response pattern, it does not issue any instruction for causing the power on-off supply unit 316 to resume power supply to the CPU 301 and others via the power supply line 320. Thus, at the time of receiving and responding to an alternative response pattern, the image forming apparatus 110 is allowed to carry out the response process while being held in the deep sleep mode without returning from the deep sleep mode to the normal mode.

In the deep sleep mode, the CPU 3081 is clock-gated so as to save power.

The controller unit 111 has an RTC 323 and a battery 324 for supplying power to the RTC 323 all the time. The RTC 323 is able to always manage the time of day using power supplied from the battery 324 even when the power to the image forming apparatus 110 is off. It should be noted that when the image forming apparatus 110 lies in the deep sleep mode, the power to the system bus 317 is shut off, and hence irrespective of whether or not the RTC 323 is normally operating, access to the RTC 323 is disabled.

Figure 4:
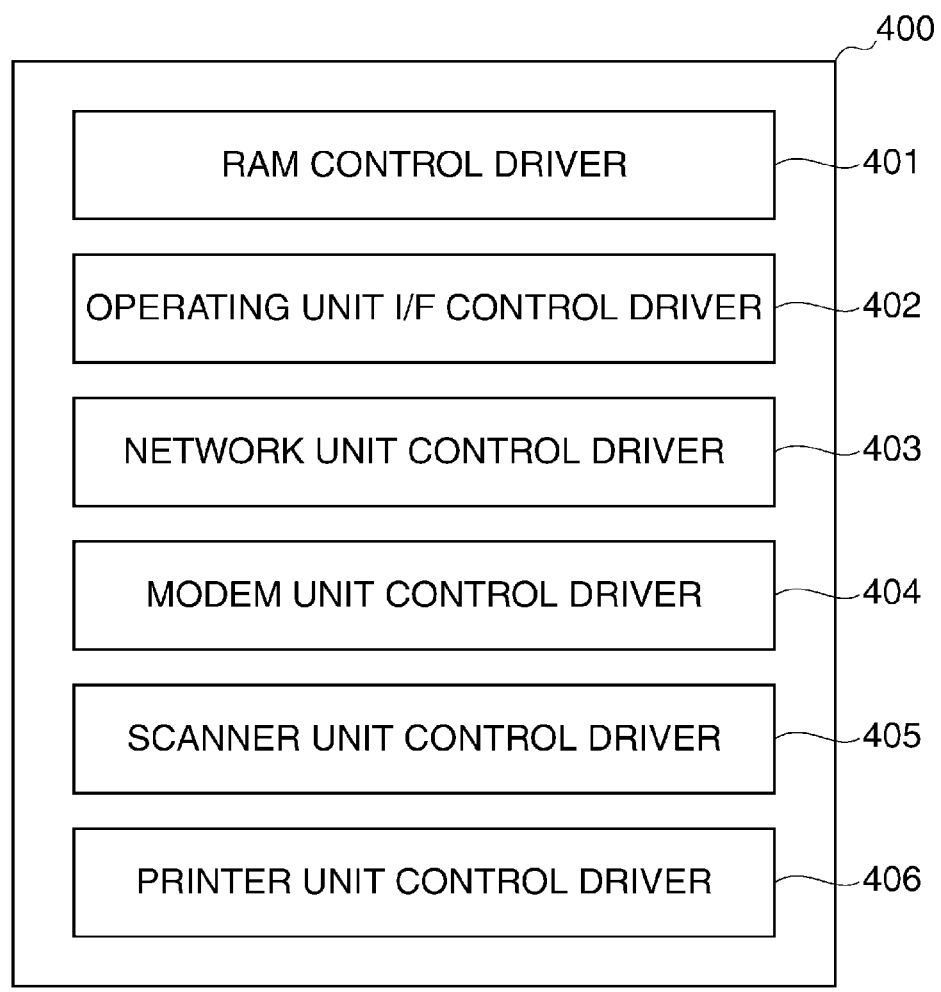
FIG. 4 is a block diagram schematically showing a software arrangement of a program that is executed by a CPU.

FIG. 4 is a block diagram schematically showing a software arrangement of a program that is executed by the CPU 301. The program in FIG. 4 is stored in the HDD 303 and loaded from the HDD 303 into the RAM 306 by the CPU 301 executing the boot program.

Referring to FIG. 4, an OS 400, which is an operation system program, operates as a basic program for executing various driver programs, to be described later. A RAM control driver 401 is a program for controlling the RAM 306 based on instructions from the OS 400.

An operating unit I/F control driver 402 is a program for controlling the operating unit I/F 307 based on instructions from the OS 400. A network unit control driver 403 is a program for controlling the network unit 308 based on instructions from the OS 400. A modem unit control driver 404 is a program for controlling the modem 309 based on instructions from the OS 400.

A scanner unit control driver 405 is a program for controlling the scanner unit 113 based on instructions from the OS 400. A printer unit control driver 406 is a program for controlling the printer unit 112 based on instructions from the OS 400.

By executing the OS 400 loaded into the RAM 306, the CPU 301 controls components such as the RAM 306, the operating unit I/F 307, the network unit 308, the modem unit 309, the printer unit 112, and the scanner unit 113. It should be noted that the programs of the control drivers 401 to 406 are allowed to run concurrently on the OS 400. The CPU 301 executes the programs while switching programs to be executed in a time-sharing manner.

Next, a description will be given of a process that is carried out to manage the time of day using the SNTP server 120 in a case where the time of day cannot be properly measured due to a trouble in the RTC 323 and clock gating of the CPU 3081 when the image forming apparatus 110 lies in the deep sleep mode.

Figure 5:
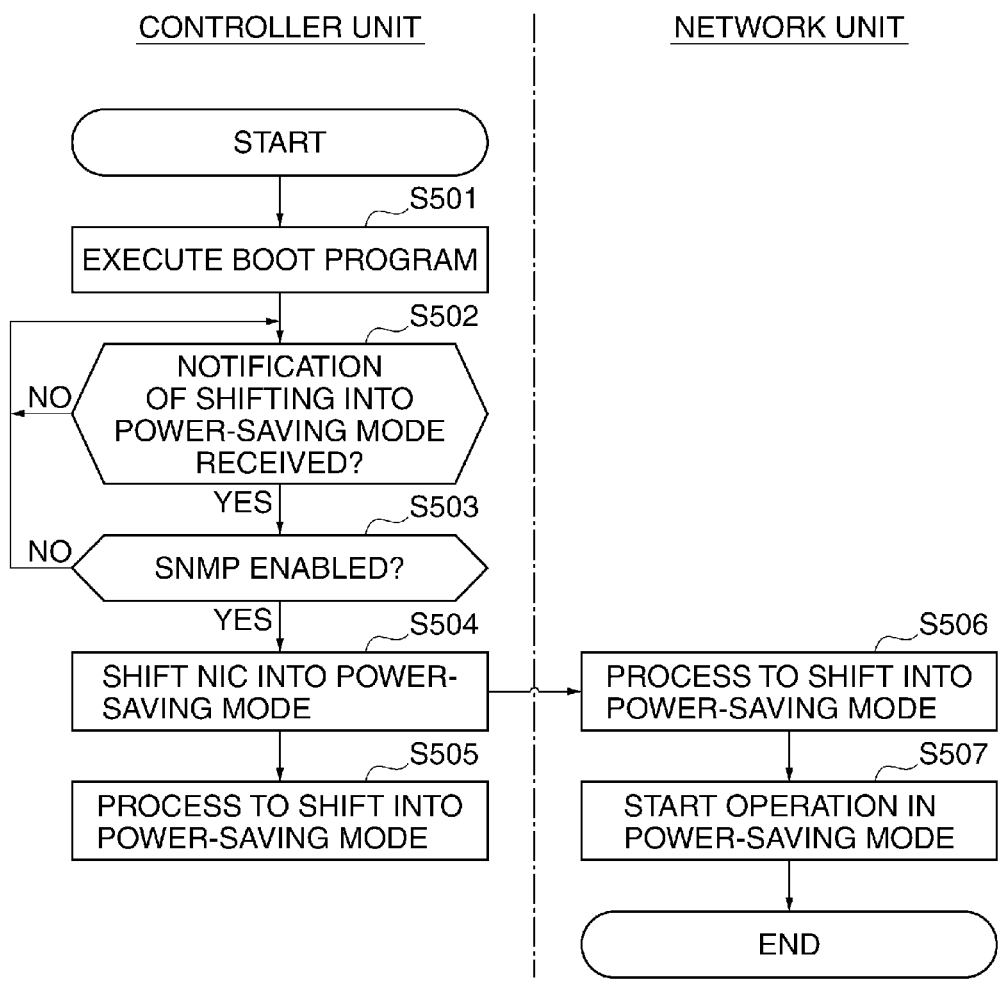
FIG. 5 is a flowchart of a process in which the controller unit shifts into a deep sleep mode.

FIG. 5 is a flowchart of a process in which the controller unit 111 shifts into the deep sleep mode. The process in FIG. 5 is started by the power supply unit 114 starting supply of power to the CPU 301.

In step S501, the CPU 301 reads the boot program stored in the ROM 302, expands it on the RAM 306, and executes the expanded boot program. By executing the boot program, the CPU 301 reads the OS 400 and the control drivers 401 and 406 in FIG. 4 from the HDD 303 and expands them on the RAM 306. Thereafter, the CPU 301 runs the OS 400 expanded on the RAM 306 and the network unit control driver 403 executed on the OS 400 to perform steps described hereafter.

The CPU 301 carries out various processes executed on the OS 400 until it receives a request to shift into the deep sleep mode. When the CPU 301 determines in step S502 that it has received the request to shift into the deep sleep mode, the process proceeds to step S503.

In the step S503, the CPU 301 determines whether or not an SNMP function of the image forming apparatus 110 is enabled. When the CPU 301 determines that the SNMP function of the image forming apparatus 110 is enabled, the process proceeds to step S504. On the other hand, when the CPU 301 determines that the SNMP function of the image forming apparatus 110 is not enabled, the process returns to the step S502 without the image forming apparatus 110 shifting into the deep sleep mode because the time-of-day management in the deep sleep state is impossible.

In the step S504, the CPU 301 sends a notification of shifting into the deep sleep mode to the CPU 3081. In the step S506, in response to the notification of shifting into the deep sleep mode from the CPU 301, the CPU 3081 shifts the network unit 308 into the deep sleep mode. At this time, when such an event as to return from the deep sleep mode at a specified time of day is set in the image forming apparatus 110, the time of day at the event is to occur is passed from the CPU 301 to the CPU 3081. When the process in the step S504 is completed, the process proceeds to step S505 in which the CPU 301 in turn shifts into the deep sleep mode and shuts off the power to the components as described above.

In the step S506, the CPU 3081 carries out a process to shift into the deep sleep mode. Clock gating of the CPU 3081 is performed in this step S506.

The CPU 3081 that has shifted into the deep sleep mode starts a packet process based on a WOL pattern and an alternative response pattern described above (step S507). At the same time, the CPU 3081 starts a correction process using a time-of-day management function of the network unit 308 in the deep sleep mode as will be described later.

Figure 6:
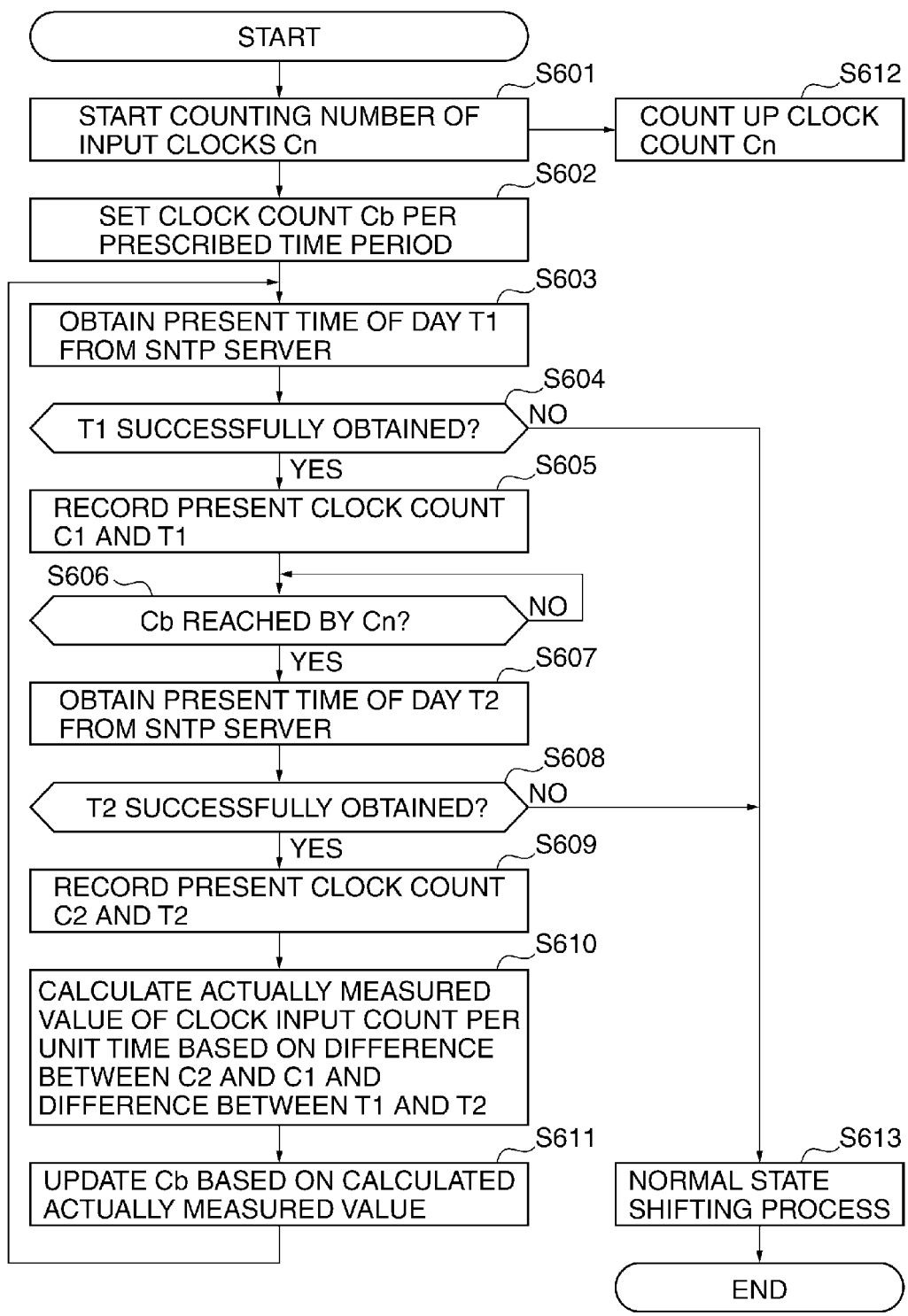
FIG. 6 is a flowchart of a correction process that is carried out by a time-of-day management function of a network unit in the deep sleep mode.

FIG. 6 is a flowchart of the correction process using the time-of-day management function of the network unit 308 in the deep sleep mode. The process in FIG. 6 is started at the time when the image forming apparatus 110 has shifted into the deep sleep mode. It should be noted that the process in FIG. 6 may be performed concurrently with a process in the deep sleep mode such as the process on packet data such as a WOL pattern and an alternative response pattern described above, and may be performed on a regular basis with particular timing.

In step S601, the CPU 3081 starts counting the number of input clocks Cn input to the CPU 3081. The number of input clocks Cn is counted up concurrently with other processes (step S612).

In the step S602, the number of input clocks Cb per prescribed time period is set and managed on the CPU 3081 or the RAM 3085. The prescribed time period is a time interval at which the time-of-day management function correction process is performed, and stored in the ROM 3084. Alternatively, the prescribed time period is not stored in the ROM 3084, but notification of the prescribed time period is provided from the CPU 301 in the step S504 and stored in the CPU 3081 or the RAM 3085.

When the number of input clocks Cb per prescribed time period is set in the step S602, the CPU 3081 obtains the present time of day T1 from the SNTP server 120 on the LAN 130 (step S603). Then, in step S604, the CPU 3081 judges whether or not the present time of day T1 has been successfully obtained as a result of the step S603. When the CPU 3081 judges that the present time of day T1 has been successfully obtained, the process proceeds to step S605. On the other hand, upon judging in the step S604 that the present time of day T1 has been not successfully obtained, the CPU 3081 determines that the time-of-day management function cannot be properly corrected, and the process proceeds to step S613, in which the CPU 3081 in turn starts a process to return to the normal mode, followed by terminating the process. It should be noted that conditions for judgment as to whether or not the present time of day T1 has been successfully obtained may be individually defined with respect to each embodiment. Examples of the conditions include whether or not a response packet, which is a response to a request packet to the SNTP server, has been received.

In the step S605, the CPU 3081 records the present count C1 of the number of input clocks counted up in the step S612, and the value of the present time of day T1 obtained in the step S603. At this time, they are recorded in the CPU 3081 or the RAM 3085.

When the step S605 is completed, the process proceeds to step S606, in which the CPU 3081 in turn monitors the number of input clocks until the prescribed time period described above has elapsed. Whether or not the prescribed time period has elapsed is determined according to whether or not the present number of input clocks Cn has reached the number of input clocks Cb per prescribed time period. When the CPU 3081 determines that the prescribed time period has elapsed, the process proceeds to step S607. On the other hand, when the CPU 3081 determines that the prescribed time period has not elapsed, it carries out the process in the step S606 again.

In the steps S607 to S609, the CPU 3081 obtains the present time of day T2 after the lapse of the prescribed time period and the number of input clocks C2 in the same manner as in the steps S603 to S605. It should be noted that in the step S608 as well, the CPU 3081 judges whether or not the present time of day T2 has been successfully obtained in the same manner as in the step S604, and when the present time of day T2 has not been successfully obtained, the process proceeds to the step S613, in which the CPU 3081 in turn returns the image forming apparatus 110 to the normal mode.

When the step S609 is completed, the number of input clocks Cb per prescribed time period is corrected in steps S610 and S611.

In the step S610, the CPU 3081 calculates an actual measured value of the number of input clocks per unit time based on a difference between C2 and C1 and a difference between T2 and T1, which were recorded in the step S605 and the step S609. Further, based on the calculated actual measured value, the CPU 3081 calculates the number of clocks Cb per prescribed time period, and updates the number of input clocks Cb in the step S611. As a result, the time-of-day management function in the deep sleep mode is corrected.

Thereafter, the CPU 3081 repeatedly carries out the processes in the steps S603 to S611 and carries out the process in the deep sleep mode while repeatedly correcting the time-of-day management function. It should be noted that as described above, the process in FIG. 6 may be carried out concurrently with other processes in the deep sleep mode. In this case, the CPU 3081 receives a specified time of day at which the image forming apparatus 110 will return from the deep sleep mode from the CPU 301 in the step S506. Then, the time that elapses before the specified time of day is converted into the number of input clocks, and whether or not the number of input clocks Cn has reached the number of clocks input before the return may be determined. At this time, when the number of input clocks Cn has reached the number of clocks input before the return, the CPU 3081 determines that the specified time of day has come, and starts returning to the normal mode. This enables return from the deep sleep mode at the specified time of day. It should be noted that when this configuration is adopted, the number of clocks input before the return should be calculated in addition to the number of input clocks Cb per prescribed time period.

According to the present embodiment, the number of input clocks per prescribed time period is calculated based on the present time of day obtained from the SNTP server 120 in the power-saving mode, in which lower power is consumed than in the normal mode, and the number of input CPU clocks counted up in the power-saving mode, and the time-of-day management function is corrected. As a result, even in an environment where the time of day cannot be properly measured in the image forming apparatus 110 in the power-saving mode, correction of the time-of-day management function in the image forming apparatus 110 is allowed, making accurate time-of-day management possible.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-235843, filed Nov. 14, 2013, which is hereby incorporated by reference wherein in its entirety.

What is claimed is:

1. An information processing apparatus comprising:
   at least one memory; and
   at least one processor connected to the at least one memory and configured to execute:
   a control task configured to shift the information processing apparatus into a power-saving mode and set a number of input CPU clocks to be provided to the information processing apparatus in the power saving mode per prescribed time period;
   an obtaining task configured to, in a case where the information processing apparatus shifts into the power-saving mode, obtain a first time of day from an external apparatus on a network;
   a counting task configured to, in response to the obtaining task obtaining the first time of day, count the number of input CPU clocks provided to the information processing apparatus and determine whether the set number of input CPU clocks has been provided; and
   a correction task configured to, in response to the counting task determining that the set number of input CPU clocks has been provided, obtain a second time of day from the external apparatus, measure the actual time period based on a difference between the first time of day and the second time of day, and correct the set number of input CPU clocks per prescribed time period based on the difference between the prescribed time period and the actual time period.

2. The information processing apparatus according to claim 1, wherein the obtaining task is configured to obtain the first time of day using SNTP (simple network time protocol).

3. The information processing apparatus according to claim 1, wherein the prescribed time period corresponds to an interval at which the correction task is configured to correct the number of input CPU clocks.

4. A control method for an information processing apparatus, the control method comprising:
   a shifting step of shifting the information processing apparatus into a power-saving mode and setting a number of input CPU clocks to be provided to the information processing apparatus in the power saving mode per prescribed time period;
   a first obtaining step of obtaining, in a case where the information processing apparatus shifts into the power-saving mode, a first time of day from an external apparatus on a network;
   a counting step of counting, in response to obtaining the first time of day, the number of input CPU clocks provided to the information processing apparatus and determining whether the set number of input CPU clocks has been provided;
   a second obtaining step of obtaining, in response to determining that the set number of input CPU clocks has been provided, a second time of day from the external apparatus;
   a measuring step of measuring the actual time period based on a difference between the first time of day and the second time of day; and
   a correction step of correcting the set number of input CPU clocks per prescribed time period based on the difference between the prescribed time period and the actual time period.

5. A non-transitory computer-readable storage medium storing a program for causing a computer of an information processing apparatus to execute a control method for the information processing apparatus, the control method comprising:
   a shifting step of shifting the information processing apparatus into a power-saving mode and setting a number of input CPU clocks to be provided to the information processing apparatus in the power saving mode per prescribed time period;
   a first obtaining step of obtaining, in a case where the information processing apparatus shifts into the power-saving mode, a first time of day from an external apparatus on a network;
   a counting step of counting, in response to obtaining the first time of day, the number of input CPU clocks provided to the information processing apparatus and determining whether the set number of input CPU clocks has been provided;

a second obtaining step of obtaining, in response to determining that the set number of input CPU clocks has been provided, a second time of day from the external apparatus;

a measuring step of measuring the actual time period based on a difference between the first time of day and the second time of day; and a correction step of correcting the set number of input CPU clocks per prescribed time period based on the difference between the prescribed time period and the actual time period.

* * * * *